Feb. 7, 1956   O. INGBRITSON   2,733,524
SNOW PLOW

Filed July 18, 1952   3 Sheets-Sheet 1

Oscar Ingbritson
INVENTOR.

BY

Feb. 7, 1956  O. INGBRITSON  2,733,524
SNOW PLOW
Filed July 18, 1952  3 Sheets-Sheet 2
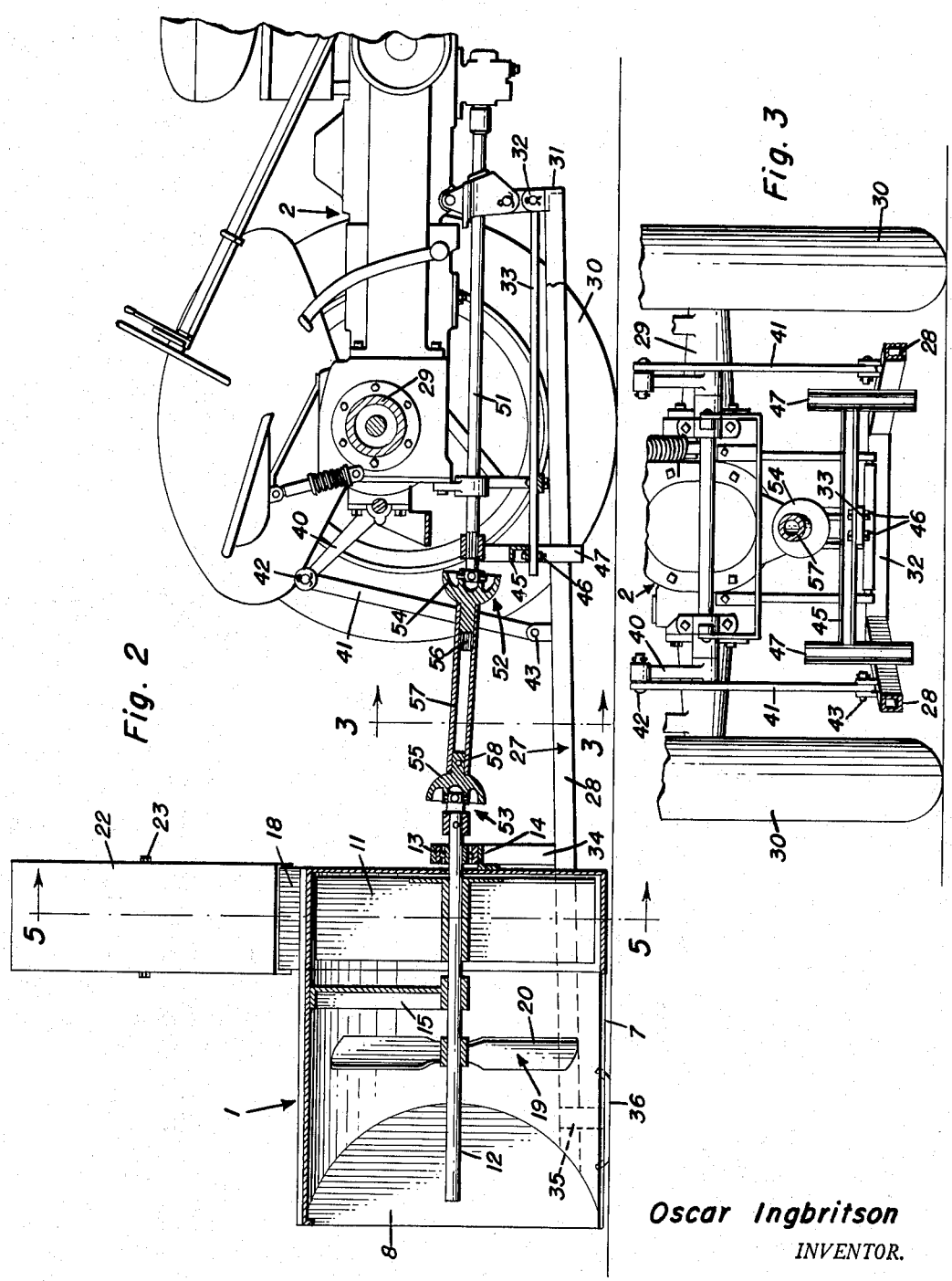
Oscar Ingbritson
INVENTOR.

Feb. 7, 1956    O. INGBRITSON    2,733,524
SNOW PLOW

Filed July 18, 1952    3 Sheets-Sheet 3

Oscar Ingbritson
INVENTOR.

United States Patent Office 2,733,524
Patented Feb. 7, 1956

2,733,524

SNOW PLOW

Oscar Ingbritson, Windom, Minn.

Application July 18, 1952, Serial No. 299,561

1 Claim. (Cl. 37—43)

My invention relates to improvements in snow plows of the tractor propelled type.

The primary object of the invention is to provide a simple form of highly efficient snow plow equipped for easy quick attachment to the conventional farm tractor in the rear thereof for pushing by travel of the tractor rearwardly so that the snow plow will not cause side slip of the tractor and the rear traction wheels of the tractor will be more effective in propelling the snow plow in a straight path than if the snow plow were attached at the front of the tractor, and pushed by forward travel of the tractor.

Another object is to provide a snow plow for the above purpose which is equipped for funneling the snow to a blower means which will scatter the snow to either side of the road, as desired, and which is equipped with rotary means for breaking up the snow and feeding the same to the blower means so that heavy and lump snows may be easily removed from the path of travel of the snow plow.

Still another object is to provide in such a snow plow for direct drive of both the blower means and the rotary means for breaking up the snow, by the rear power take-off of a farm tractor, also to provide for lowering and raising of the snow plow into and out of operative position by the power lift of the tractor.

Other and subordinate objects, together with the precise nature of my improvements, and the advantages thereof will be readily understood when the succeeding description and claims are read with reference to the drawings accompanying and forming part of this specification.

In said drawings:

Figure 2 is a view in longitudinal section taken on the line 2—2 of Figure 1;

Figure 3 is a detailed view in vertical transverse section taken on the line 3—3 of Figure 2;

Figure 1:
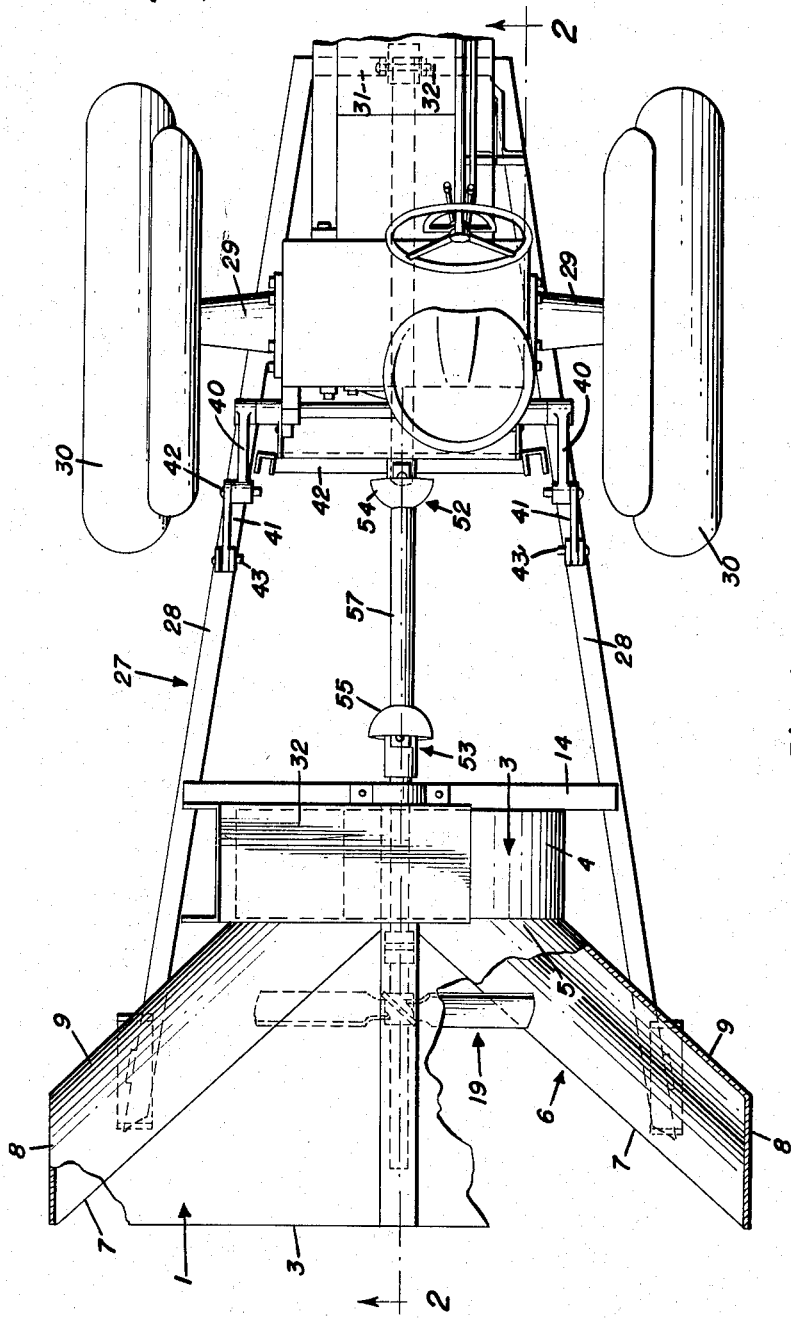
Figure 1 is a view in plan partly broken away and shown in section of my improved snow plow, in the preferred embodiment thereof attached to a farm tractor.
Figure 4:
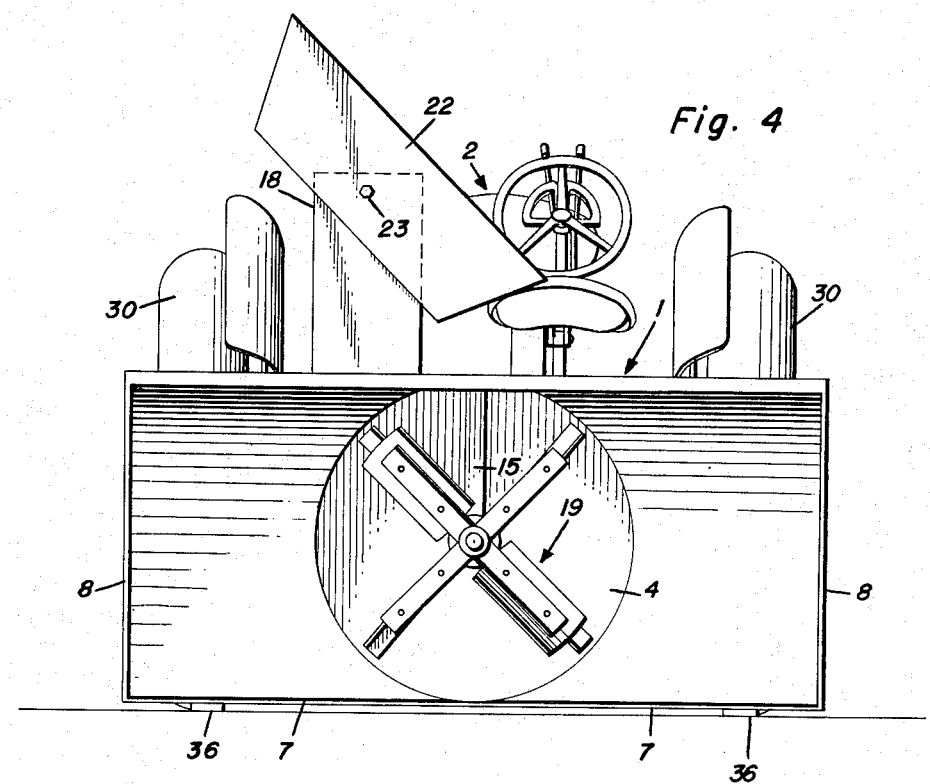
Figure 4 is a view in rear elevation.

Referring now to the drawings by numerals, the snow plow of my invention comprises a flat, closed top, scoop 1 in the rear of the tractor 2 having an open front end facing in the direction of rearward travel of the tractor and flaring toward said front end from a blower means 3 on its rear end comprising a substantially circular blower fan casing 4 opening at its front into the rear end of the scoop 1.

The scoop 1 is provided with a V-shaped opening 6 in its bottom, as shown in Figure 1, forming rearwardly converging internal cutting edges 7 at the bottom of the scoop terminating at the bottom of the blower fan casing 4. The scoop 1 terminates at its front in vertical flat, segmental side walls 8 parallel to the path of travel of the scoop and serving a purpose presently seen. Between the walls 8 and said casing 4, the scoop 1 is provided with sides 9 of downwardly and inwardly rounded cross-section to form said opening 6 and cutting edges 7.

The blower means 3, in addition to the blower fan casing 4, comprises a blower fan 11 in said casing fastened on a horizontal driven shaft 12 extending through said casing 4 axially thereof and forwardly into the scoop 1 in the longitudinal center of the scoop. The shaft 12 has a rear end journaled in a ball bearing 13 suitably fixed on a cross bar 14 in the rear of the casing 4 and forming part of a pusher frame presently described in detail. A hanger bearing 16 depending from the top of the scoop 1 supports the shaft 12 forwardly of the blower fan casing 4 for an obvious purpose.

An uptake discharge flue 18 extends upwardly from the circumferential portion of said casing 4 tangentially thereof and above the same.

A bladed fan 19 is fixed on the shaft 12 in the scoop 1 forwardly of the hanger bearing 15 and blower means 3 and which operates to break up the snow in said scoop 1 and is pitched to propel and feed the snow rearwardly into the blower fan casing 4. The fan 19 is closely adjacent the blower fan 11.

Figure 5:
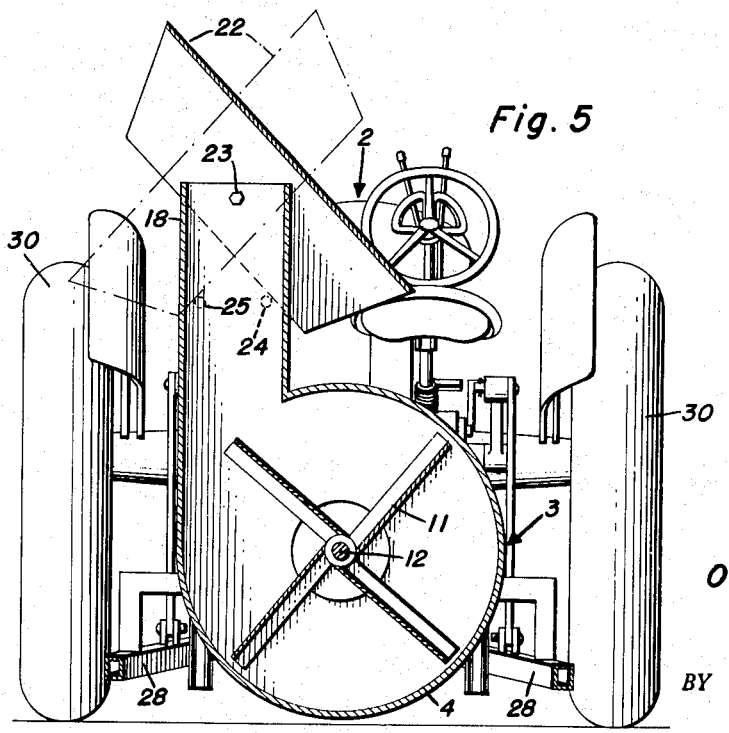
Figure 5 is a view in vertical transverse section taken on the line 5—5 of Figure 2.

A snow discharge deflector 22 of inverted channel form is pivoted intermediate its ends, as at 23 on the upper end of the discharge flue 18 to extend endwise across the same and transversely of the path of travel of the scoop 1 and is adapted to be swung into oppositely inclined upwardly tilted positions to deflect snow discharged by the flue 18 to opposite sides of the road or path of travel of the scoop 1. A pair of stops 24, 25 on the flue 18 are provided for engagement by the deflector 22 to establish the oppositely inclined positions of said deflector which are shown in full lines and in dotted lines in Figure 5. A pusher frame 27 is provided for attaching the scoop 1 and the blower means 3 to the tractor 2 which has been conventionally and fragmentarily illustrated as sufficient for the present purposes.

The pusher frame 27 comprises a pair of side bars 28 extending rearwardly from the tractor 2 beneath the axle and differential housing 29 of the rear tractor wheels 30 and with rear ends cross connected by a bar 31 pivoted between its ends, on the attaching bolt 32 of the draw bar 33 of the tractor 2 so that said frame is vertically swingable on said bolt to raise or lower the scoop 1 and the blower means 3 with said scoop. The before mentioned cross bar 14 cross connects said side bars 28 immediately in the rear of the fan casing 4 being connected to said bars 28 by legs 34. The front ends of the side bars 28 extend under the sides 9 of the scoop 1 and are suitably fixed to uprights 35 rising from runners 36 underlying and suitably fixed to the sides of the scoop 1 to support said scoop and the blower means 3 with the cutting edges 7 of the scoop 1 and the bottom of the blower casing 4 slightly elevated.

Operating connections are provided between the usual power lift arms 40 of the tractor 2 and the side bars 28 so that the pusher frame 27 may be raised and lowered by operation of said arms in the usual manner to raise and lower the scoop 1 and blower means 3 into and out of position for operating in snow. These connections comprise links 41 pivoted to said lift arms 40 and said side bars 28 as at 42, 43. Means is provided intermediate the side bars 28 for guiding the same in vertical swinging thereof and preventing side play of the pusher frame 27. This means comprises a channel bar 45 bolted as at 46 on the rear end of the draw bar 33 to extend transversely thereof and of the pusher frame 27 and having suitably fixed to the ends thereof a pair of vertical guide bars 47 disposed adjacent the inner sides of the side bars 28 and which are preferably of channel form.

Direct driving connections are provided between the rear power take-off shaft 51 of the tractor 2 and the rear end of the drive shaft 12 comprising a pair of universal joints 52, 53 including joint members 54, 55. The joint member 54 is splined as at 56, in one end of a hollow shaft 57 in the other end of which joint 55 is fixed by a pin 58. As will be seen, the joint member 54 slides in the tube 57 so that the direct driving connection compensates for vertical swinging of the scoop 1, blower means 3 and frame 27 relative to the tractor 2.

The operation of my invention will be readily understood. As the tractor 2 is driven rearwardly, with the power take-off operating, the scoop 1 is forced forwardly into snow riding on the runners 36 and funnels the snow into the blower fan casing 4. As the scoop 1 progresses, the cutting edges 7 cut into and pick up the snow, the sides 9 directing the snow into said casing 4 while the fan, or propeller, 19 breaks up the snow in the scoop 1 and propels the same toward and into said casing 4 in finely divided form. The blower fan 11 blows the snow in the casing 4 upwardly out of the flue 18 to be discharged to one side or the other of the road or path of travel of the scoop 1 according to the position in which the deflector is swung. By operation of the power lift arms 40, through the conventional power lift operating mechanism, not shown, the frame 27 may be swung upwardly or downwardly to position the scoop 1 into or out of operating position. As will be apparent, the frame 27 pivots vertically to permit the scoop 1 to ride over uneven places. The walls 8 cut straight into the snow.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described my invention, what is claimed as new is:

A snow plow attachable to the rear power lift arms and rear power take-off of a tractor to be pushed forwardly by travel of the tractor rearwardly, said snow plow comprising a scoop having a circular vertical and open rear end, sides flaring forwardly from said rear end and of concavo-convex vertical cross section, a flat V-shaped top connecting said sides, and flat inturned bottom cutting portions on said sides converging rearwardly to the bottom of said rear end and coplanar and horizontal, a circular fan casing on the rear end of the scoop of the same diameter as said rear end with an open front of like diameter concentric to said rear end and opening directly thereinto, a snow discharge flue on said casing, a rotary blower fan in said casing, a rotary snow propeller in said scoop forwardly of and smaller in diameter than said fan, and a common supporting shaft for said fan and propeller journaled in said scoop and casing coaxially with the casing and attachable to said power take-off.

References Cited in the file of this patent

UNITED STATES PATENTS

| | | |
|---|---|---|
| 1,480,622 | Lee | Jan. 15, 1924 |
| 1,563,920 | Peters et al. | Dec. 1, 1925 |
| 1,848,554 | Smith et al. | Mar. 8, 1932 |
| 2,315,007 | Morse et al. | Mar. 30, 1943 |
| 2,347,116 | Oppegaard | Mar. 2, 1948 |
| 2,603,007 | Fiacco | July 15, 1952 |

FOREIGN PATENTS

| | | |
|---|---|---|
| 472,037 | Canada | Mar. 13, 1951 |

OTHER REFERENCES

Spokely: Abstract, Serial No. 99,751, 652 O. G. 617, November 13, 1951.